US012011735B2

(12) United States Patent
Moran et al.

(10) Patent No.: US 12,011,735 B2
(45) Date of Patent: Jun. 18, 2024

(54) MATERIAL DEPOSITION DEVICE

(71) Applicant: Signature Brands, LLC, Ocala, FL (US)

(72) Inventors: Sean Moran, Corvallis, OR (US); Thomas Thiemann, Orlando, FL (US); Charles Hodges, Clemmons, NC (US); Joshua Gordon, Ocala, FL (US)

(73) Assignee: SIGNATURE BRANDS, LLC, Ocala, FL (US)

(*) Notice: Subject to any disclaimer, the term of this patent is extended or adjusted under 35 U.S.C. 154(b) by 0 days.

(21) Appl. No.: 17/941,852

(22) Filed: Sep. 9, 2022

(65) Prior Publication Data

US 2023/0084378 A1 Mar. 16, 2023

Related U.S. Application Data

(60) Provisional application No. 63/242,989, filed on Sep. 10, 2021.

(51) Int. Cl.

| | |
|---|---|
| ***B05C 19/04*** | (2006.01) |
| ***B05C 9/02*** | (2006.01) |
| ***B05C 13/00*** | (2006.01) |
| ***B05C 15/00*** | (2006.01) |
| ***B05D 1/00*** | (2006.01) |

(52) U.S. Cl.
CPC .............. *B05C 19/04* (2013.01); *B05C 9/022* (2013.01); *B05C 13/00* (2013.01); *B05C 15/00* (2013.01); *B05D 1/00* (2013.01)

(58) Field of Classification Search
None
See application file for complete search history.

(56) References Cited

U.S. PATENT DOCUMENTS 3,567,485 A * 3/1971 Lemelson ............... B05C 19/02 427/195
3,670,699 A * 6/1972 Sargent ................. B05C 19/025 118/DIG. 5
6,161,317 A * 12/2000 Wang ...................... G09F 19/08 40/406
2008/0182481 A1* 7/2008 Yang ....................... G09F 19/02 40/406

* cited by examiner

*Primary Examiner* — Alexander M Weddle
(74) *Attorney, Agent, or Firm* — Cozen O'Connor

(57) ABSTRACT

A material deposition device for decorating an object. The device has a housing as a structural framework, an object holder, and a container releasably coupled to the housing. The housing has an object support for supporting the object to be decorated. The container creates a volumetric enclosure with the housing. The device is configured to deposit decoration materials onto the object.

19 Claims, 4 Drawing Sheets

MATERIAL DEPOSITION DEVICE

CROSS-REFERENCE TO RELATED APPLICATION

This application claims benefit under 35 U.S.C. 119(e) of U.S. Provisional Patent application No. 63/242,989, filed Sep. 10, 2021, the entirety of which is hereby incorporated by reference.

BACKGROUND OF THE INVENTION

1. Field of the Invention

The invention relates to a device, which is capable of depositing materials onto an object for holiday decoration.

2. Related Art

Holiday decoration is a popular tradition throughout the world. For example, the Easter holiday holds well-established traditions for the decoration of Easter eggs, and the art of decorating eggs and similar objects has been practiced for centuries. These eggs are traditionally comprised of real eggs generated by chickens, but also are often manufactured from synthetic materials such as plastic and foam. However, Easter egg decoration materials and methods have seen only incremental innovations in the past several years. Recent innovations have included unique or colorful decoration materials or objects that can be manually deposited onto, or connected to, an Easter egg. Industry incumbents have competed with minor updates or iterations to materials and methods to attract consumers to their decoration products. Typical materials and methods for decorating Easter eggs are highly manual in nature. Significant time and effort are required to decorate an Easter egg, and nearly every current material and method for decorating Easter eggs generates messes and sometimes even irreversible damages to clothing and other surfaces. Such existing techniques include stickers, painting, food coloring, and using other decoration materials. The decoration process often results in messes due to the distribution of the decoration materials throughout the decorating location (e.g., clothing, hands, working surfaces, etc.), thus requiring time-consuming cleanup.

A need therefore exists for an improved device and method of decorating Easter eggs and similar objects.

SUMMARY OF THE INVENTION

The present invention is related to a material deposition device for decorating articles, such as eggs, nuts, candies and similar objects of the type commonly used as gifts and decorations on holidays, such as, by way of non-limiting example, Easter, Thanksgiving, and Christmas. The present invention and method solve the problems discussed previously by providing an option of automatic deposition of decoration materials in a contained environment while providing an entertaining visual effect by allowing participants to view the deposition process. A purpose of the present invention is to provide a simple and inexpensive apparatus and also an entertaining method of decorating objects, such as Easter eggs.

In accordance with one aspect of the present invention, a device and method for deposition of materials onto an object (real egg, synthetic egg or other substrate) is described here. A material deposition device comprises a housing having an air circulator and power source to provide energy to the air circulator to impart motion to the decoration materials when the container is coupled to the housing. The object to be decorated is temporarily and securely restrained in an object holder. The object holder is permanently connected to the housing to create a stable and secure holder for the object. A container is provided having a volume defining a decorating area or environment including the object and the object holder. The methodology for use of the device includes preparation of the object to be decorated with desired decorating processes and materials, followed by securing the object to the object holder. The user may also choose to add adhesive to the object surface to encourage more densely deposited materials onto the object. The adhesive comprises common adhesive or proprietary food-grade adhesives. The user places the desired decoration materials, such as confetti, glitter, or other materials inside of the device, prior to, or after, connecting the container to the housing. The user then operates the device by activating the power switch, which energizes the electrical connection between the power source and the air circulator. The device dynamically suspends the decoration materials into the air inside the device. Random dynamic interactions between the suspended decoration materials and the object automatically deposit the decoration materials onto the object. Once the user is satisfied with the results of the automatic decoration, the power switch is de-energized such that the decoration materials are no longer suspended, and the container is detached from the housing. The user may choose to remove the decorated object from the device if preferred, or the user may choose to leave decorated object in the device or continue decorating the object through sequential operations of the device methodology to compound decoration materials.

BRIEF DESCRIPTION OF THE DRAWINGS

Other objects and features of the present invention will become apparent from the following detailed description considered in conjunction with the accompanying drawings. It is to be understood, however, that the drawings are designed solely for purposes of illustration and not as a definition of the limits of the invention, which is defined by the claims appended hereto. It should be further understood that the drawings are not necessarily drawn to scale and that, unless otherwise indicated, they are merely intended to conceptually illustrate the structures and procedures described herein. In the drawings:

DETAILED DESCRIPTION OF THE PRESENTLY PREFERRED EMBODIMENTS

FIGS. 1-4 are schematic illustrations of a novelty material deposition device showing the components thereof as well as an egg or egg-shaped object to be decorated. It will be recognized that in most cases, the object to be decorated will be an egg-shaped decorative item, such as an Easter egg, however the invention is not limited to such an embodiment and, for example, the object to be decorated may be in other shapes instead of egg-shaped, in which case, a holder of the object will be so-configured.

As will be discussed in detail below, the novelty design of the present invention permits a user to decorate objects, such as Easter eggs, in a visually-entertaining way which allows the viewer(s) to watch the decorating process. The design will create attractive and unique decorations on the object to increase its aesthetic appearance, and also provide a simple solution for clean-up and storage after the decorating process.

Figure 1:
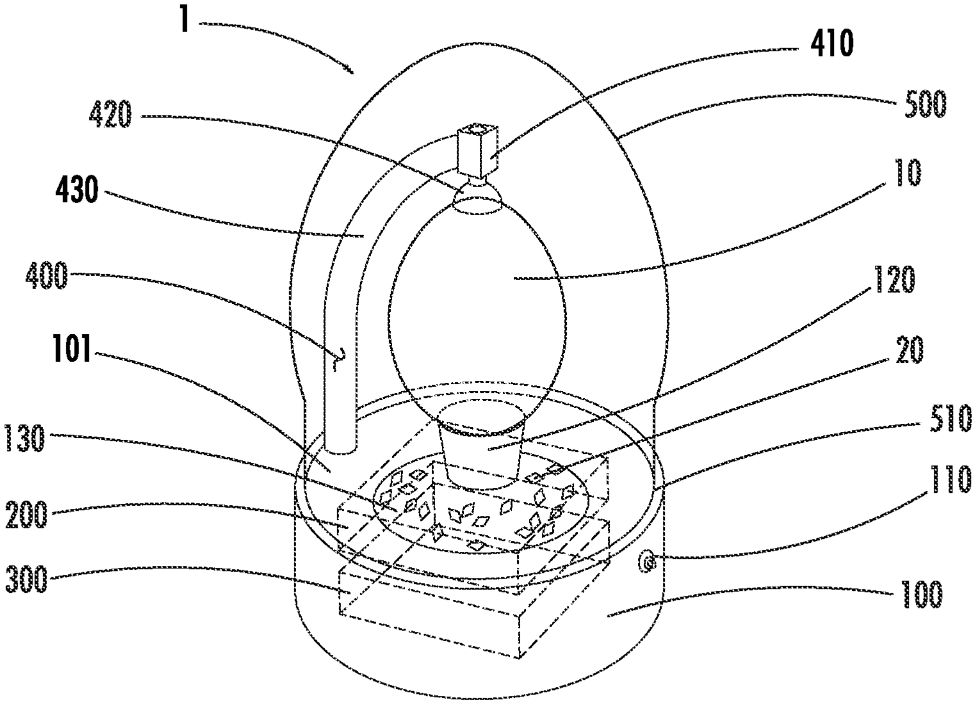
FIG. 1 is a perspective view of the assembled device for decorating an object, and showing the object to be decorated.

FIG. 1 illustrates the material deposition device 1, with an object 10 positioned in an intended manner. The device 1 has a housing 100 and a container 500, which include various elements, aspects, and functionalities of the device 1. As shown here, the eggs or egg-shaped object 10 is held in a stable manner under the container 500 positioned on the housing 100. In some embodiments, the housing 100 includes an air circulator 200, a power source 300, and an object holder 400. In such embodiments, the housing 100 may further include a power switch 110, an object nest or support 120, and an air membrane 130. A housing top 101 enclosing the top portion of the housing 100 is sloped downward from the outer boundary to the inner boundary, where it interfaces with the air membrane 130. In such embodiments, the housing top 101 is sloped in a similar manner as a funnel, which enables several features described herein. The air circulator 200 is powered by the power source 300, which provides sufficient energy to generate turbulent air flow conditions (e.g., appropriate air flow rates and pressures) capable of dynamically suspending decoration materials 20 inside the device 1. A power switch 110 may be provided for energizing the power source 300 during operation of the device 1. In various embodiments, the object support 120 matches the different geometries of the object 10 to provide appropriate structural bearing support and restraint force for the object 10 while, preferably, exposing a maximum of surface area of the object to be decorated. It should be understood that the object support 120 may be of a fixed dimension or may be adjustable for better supporting the object to be decorated. For example, in some embodiments, the object support 120 may include an adjustable opening that can be sized by a user, e.g., by manipulating a thumb screw or the like, to accommodate objects of varying sizes.

It should be noted that any suitable design for the housing 100 for supporting the container 500 and object 10 can be used, as long as its shape and dimensions allow the operation. In some embodiments, the housing 100 may be made from rigid materials, such as hard plastic or stainless steel, to provide sufficient rigidity to maintain an overall shape for support. In some embodiments, the housing 100 can also include more user friendly features. For example, the housing 100 may include one or more access doors as discussed below.

In some embodiments, the air membrane 130 is attached to the housing top 101 and enables air flow to exit through the housing top 101 into the volume surrounding the object 10 in the container 500, while also preventing the decoration materials 20 from entering the housing 100. It should be understood that the air membrane 130 is not required for the device to function, but it may improve functionality of the device 1 and uniform air circulation, depending upon the type of decoration materials 20 that is utilized in the device 1.

In some embodiments, the decoration materials 20 used for decorating are well known and readily available commercially, such as confetti, glitter, or other decoration materials, preferably those approved by the Food and Drug Administration (FDA) and conventionally used to decorate eggs in different colors, including red, yellow, blue, brown, orange, green, pink, chartreuse, or combinations of the above. In some embodiments, the air membrane 130 may be made of a simple screen material or other air-permeable materials. It should be understood that the air membrane 130 may be selected on the basis of allowing air to flow through but preventing the selected decoration materials 20 from translating downward into the housing 100.

In various embodiments, the power source 300 may include standard batteries, a power supply powered by external energy, such as 120 volt power, or standard universal serial bus power from a standard connection on a computer/laptop or other similar devices. It should be understood that the specifications of the power source 300 should be matched to the power requirement of the air circulator 200 to function properly. In some embodiments, the air circulator 200 is operable only when the housing 100 is connected to the container 500 to prevent the accidental operation of the device 1, for example, by children. In some other embodiments, the air circulator 200 is capable of operating at multiple speeds, for example, via a variable-frequency drive (VFD).

In various embodiments, the object holder 400 may be connected to the housing 100 in different manners to constrain the object 10 in conjunction with the object support 120. For example, in some embodiments, the object holder 400 may be permanently connected to the housing 100 by adhesives. In some other embodiments, the object holder 400 may be removably connected to the housing 100 by fasteners or other feasible mechanical interference features that are often utilized in the state of the art in the field of this invention. It should be understood that the object holder 400 may or may not be included in the device 1 depending upon the desired embodiment for the specific application.

As shown here, in some embodiments, the object holder 400 includes a bushing 410, an upper support 420, and a gantry arm 430. In such embodiments, one end of the gantry arm 430 may be connected to the housing top 101, and the other end of the gantry arm 430 may be connected to the upper support 420 via the bushing 410. In such a manner, the object holder 400 distributes the support load imparted onto the object 10 to the housing 100 through mechanical principles, and the upper support 420 matches the geometry of the object 10 to ensure necessary mechanical support and protection to the object 10. The mechanical coupling between the object support 120 and the upper support 420 provides secure relative position and protection of the object 10 during operation of the device 1, while the object support 120 and the upper support 420 also maintains adequate distance from the object 10 so as not to disrupt the material deposition process.

In some embodiments, the upper support 420 may be fabricated from flexible materials, such as elastic plastic, or solid materials, such as injection molded plastic. The bushing 410 is capable of accommodating support of the object 10, but may also incorporate additional functionality if desired, or require by the specific object 10.

In some embodiments, the bushing 420 may include an integrated mechanical spring into a bore hole or similar feature that is often applied in this field into the volume of the bushing 410 to generate the capability of a spring loaded upper support 420. In such embodiments, the integrated mechanical spring enables the device 1 to accommodate varying morphologies of the object 10, such as observed in farm eggs. This functionality may be useful for specific embodiments of the device 1.

In some embodiments, the container 500 may be a transparent or translucent shell releasably connectable to the housing 100 in a manner to seal the inner volume of the device 1. In various embodiments, the morphology of the container 500 may be designed such that the material deposition process of the object 10 meets the requirements stated herein, including the optimization of functions disclosed herein to ensure random interactions of dynamically suspended decoration materials 20 onto the object 10. In various embodiments, the container 500 may be dome-shaped and fabricated from normal industrial materials used in the field, such as glass, clear plastic (e.g., polycarbonate, acrylic, etc.), or other readily available materials as long as the selected material is easily washable and visibly clear. Preferably, container 500 is formed of a plastic material that is less susceptible to breaking or cracking, as compared to glass. It should be also understood that although the container 500 is shown having an oval or egg shaped configuration such that its walls are substantially, continuously curved to provide efficient air circulation and, hence, circulation of the decoration materials. Other shapes, of course, will be known to those of ordinary skill in the art.

In some embodiments, the container 500 may connect to the housing 100 via a container housing connection 510. For example, the container housing connection 510 may be a threading mechanism between the housing 100 and the container 500 to allow the container 500 to be easily attached and detached, by turning to engage the threading mechanism on the container housing connection 510. In some embodiments, the threading engagement may only require a slight rotation. In such embodiments, the object 10 may be put in place within the device 1 when the container 500 is detached from the housing 100, and then the container 500 may be placed over the object 10 and turned to engage the threading mechanism to couple the housing 100 and the container 500 together. When the decoration process is complete, the container 500 is again disengaged by turning (e.g., counter-clockwise) to allow the object 10 to be removed from container 500 if preferred by the user.

In some other embodiments, the container housing connection 510 may be a slot mechanism (e.g., a snap-fit mechanism), that accommodates the bottom geometry of the container 500. The design and requirements of this container housing connection 510 is such that when connected, the container 500 is temporarily and securely held in place during the materials deposition process so that, during air circulation, detachment is prevented.

Figure 3:
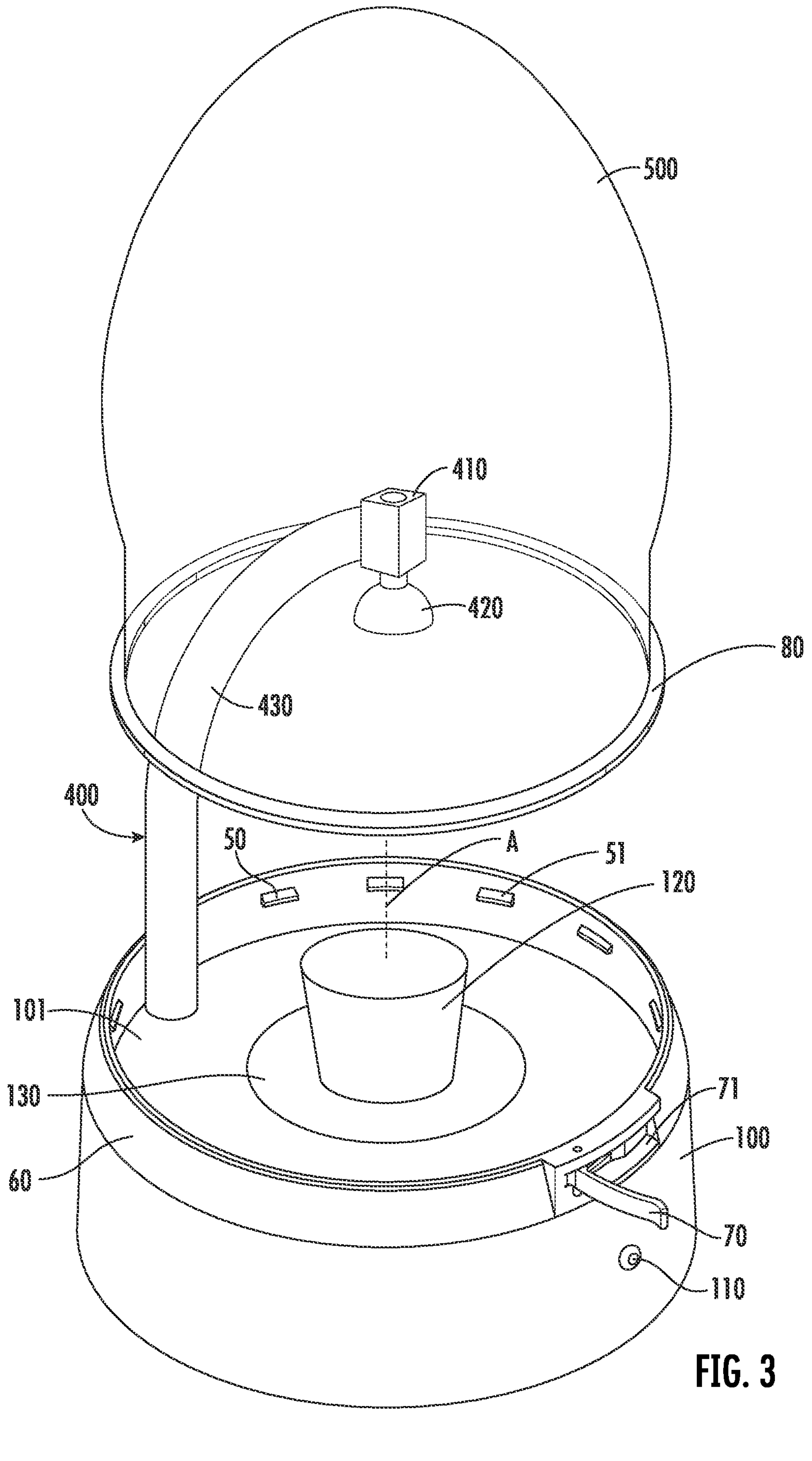
FIG. 3 is a disassembly view of the device, illustrating the interfacing safety/locking mechanism coupling the container and housing together.

In some embodiments as shown in FIG. 3, one or more retention members 50 (e.g. lugs, taps, projections, dimples) may be used to axially retain the container 500 with the housing 100. The retention member 50 may also allow for relative rotation between the housing 100 and container 500. In such embodiments, the housing 100 may include a receiving collar 60 surround the perimeter of the housing top 101 for removably coupling with the container 500, and the one or more retention members 50 may be located on the inner surface of the receiving collar 60 and project inwardly therefrom.

When assembled, the receiving collar 26 may overlap a sidewall or skirt 80 of the container 500. Accordingly, the housing 100 may include an annular groove, channel, wall, or other abutting structure for receiving the skirt 80 of the container 500. In combination of the one or more retention members 50, the container 500 can be securely engaged with the housing 100, which may allow the user to shake or move the device safely. The one or more retention members 50 may travel 360 degrees or a portion thereof, allowing the rotation of the container 500 relative to the housing 100. It should be understood that the retention member 50 may be a variety of constructions including variations in sizes, locations and shapes.

In some embodiments, an interfacing mechanical safety/locking structure/mechanism 70 may be used to retain the container 500 within the housing 100 or vice versa. For example, any structure outlined may be swapped in position between the two structures so that the interference fit or retention is maintained. For example, an elastic body cam lock or latch 70 and a lock receiving opening 71 may be used to lock or fix the position between the two structures. When in a disengaged position as shown in FIG. 3, the locking mechanism 70 (e.g. a cam lock/latch) allows the container 500 to rotate about the axis A of the housing 100 and be installed and, preferably, circulation of air Is prevented when the locking mechanism is disengaged.

Although the cam lock 70 is shown in the embodiments, it should be understood that a variety of one or more locking mechanisms may be used to fix the position between the housing 100 and the container 500. The locking mechanism 70 may include, for example, geometric coupling (e.g., dovetails, tongue-and-grooves, pin-and-slots, etc.), and fasteners of many types (e.g., screws, bolts, rivets, pins, ball detents, spring retainers, etc.). For example, in some embodiments, screws which enter into the side of the fixture and which contact container 500 to maintain relative position between the housing 100 and the container 500 may be utilized. As well, for example, rotational stop-locks with threads engaging between the two structures, engagement lugs which engage at specific rotational positions, push and turn engagement structures between the between the housing 100 and the container 500 may also varyingly be implemented.

In some embodiments, the one or more retention members 50 may include one or more different retention members 51. The one or more retention members 50, 51 may be different in shape, size, quantity, position, and construction. For example, as shown in FIG. 3, the retention members may include at least two separate retention members 50 and 51 to aid in separation/engagement of the container 500 with the housing 100. Alternatively, a first retention member 50 may be considered a "hard stop" and a second retention member 51 may be considered a "soft stop". The second retention member 51 may maintain axial rotation/axial engagement but allow for removal/attachment to the groove. The first retention member 50 may be used in combination with the rotational locking mechanism 70 to secure the rotational position and/or engage the sealing function of the receiving collar 60 and the skirt 80, and/or maintain axial rotation/axial engagement. The second retention member 51 may assist the user in removing/attaching the container 500 from the axial and/or rotational engagement. For example, the first retention member 50 may be unable to disengage from the container 500 unless the second retention member 51 disengages first. Further in some embodiments, the first retention member 50 may need to be axial engaged with the container 500 first before the second retention member 51.

In some embodiments, the second retention member 51 may require less axial removal force than the first retention member.

Figure 4A:
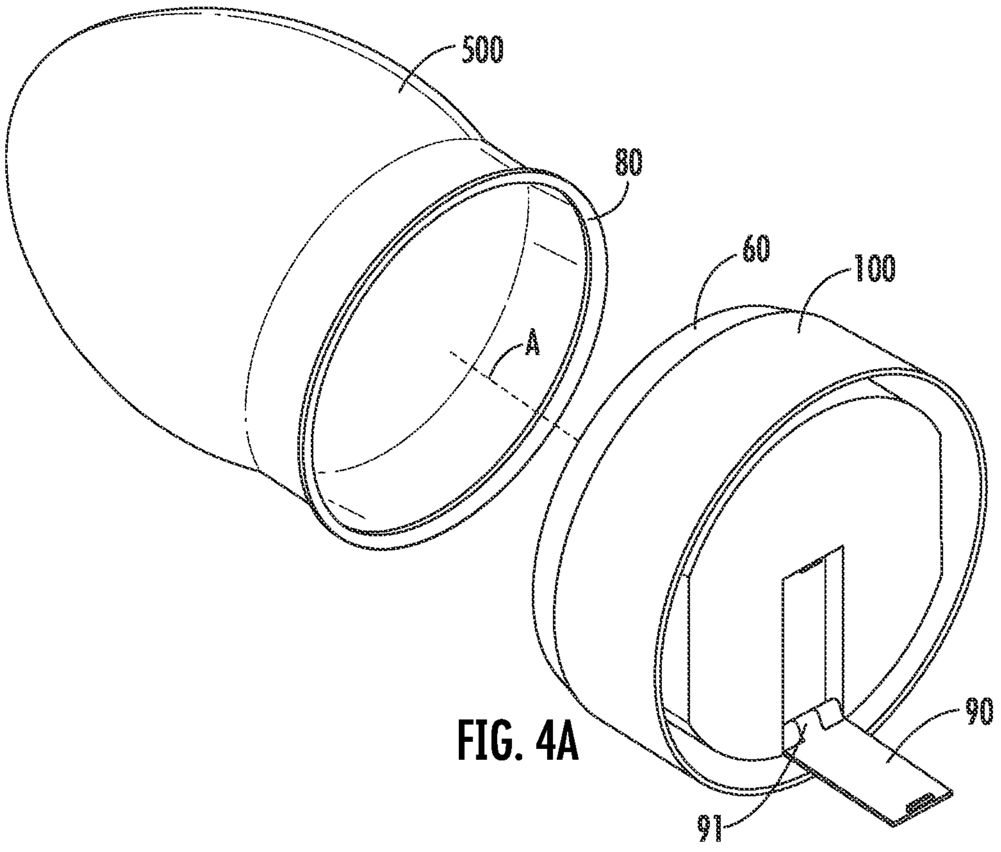
FIGS. 4A and 4B are bottom disassembly views, illustrating a battery compartment access door at the bottom of the housing.
Figure 4B:
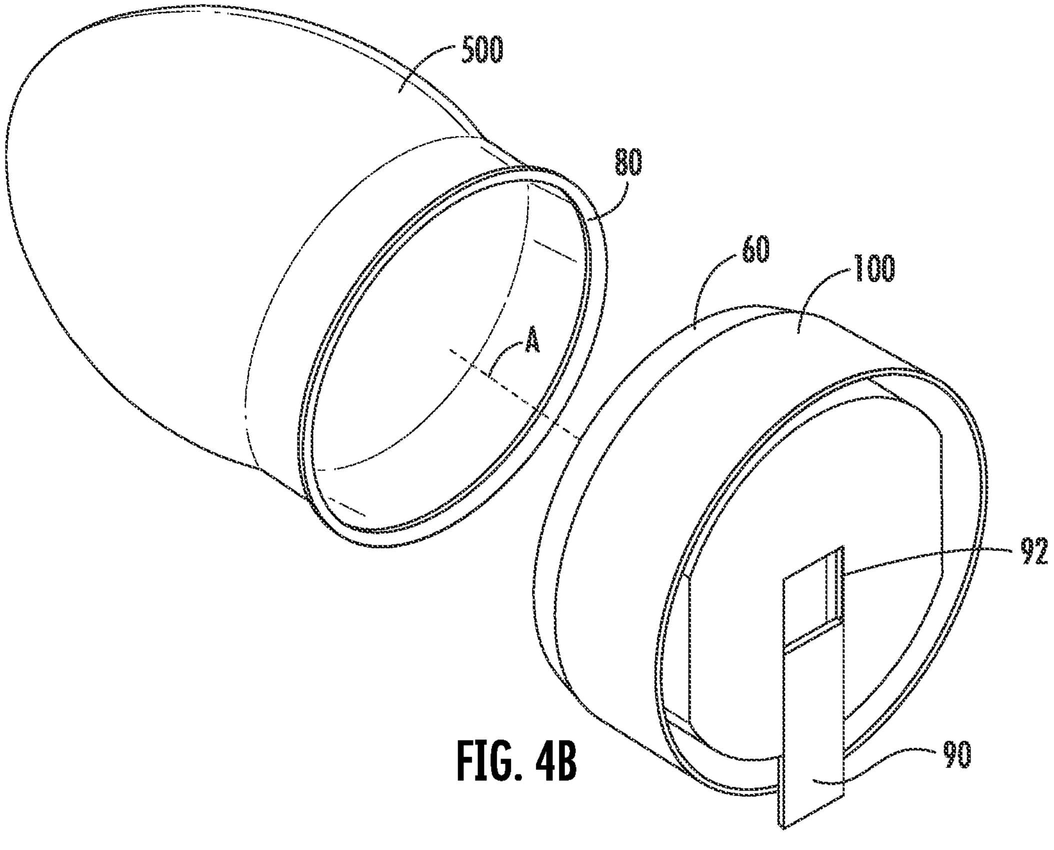

In some embodiments as best shown in FIGS. 4A and 4B, the device 1 may further include an access door 90 on the housing 100 to allow user access to a cavity for battery replacement. Alternatively, the access door can be on the container 500 (not shown) to allow user access to an interior of the container to insert, remove, or replace objects from/to object support 120. Preferably, the access door is positioned to limit obstruction of the object positioned in the container 500. The user may place/remove the object 10 and/or the decoration materials 20 from the device 1 through the access door 90. The access door 90 may also be provided for replacing/fixing the air circulator 200 and/or the power source 300 within the housing 100. In different embodiments, the access door 90 may be in a pivoting manner 91 or sliding manner 92, as shown in FIGS. 4A and 4B, respectively. It should be understood that the size, location, and/or configuration of the access door 90 are not limited here.

Figure 2:
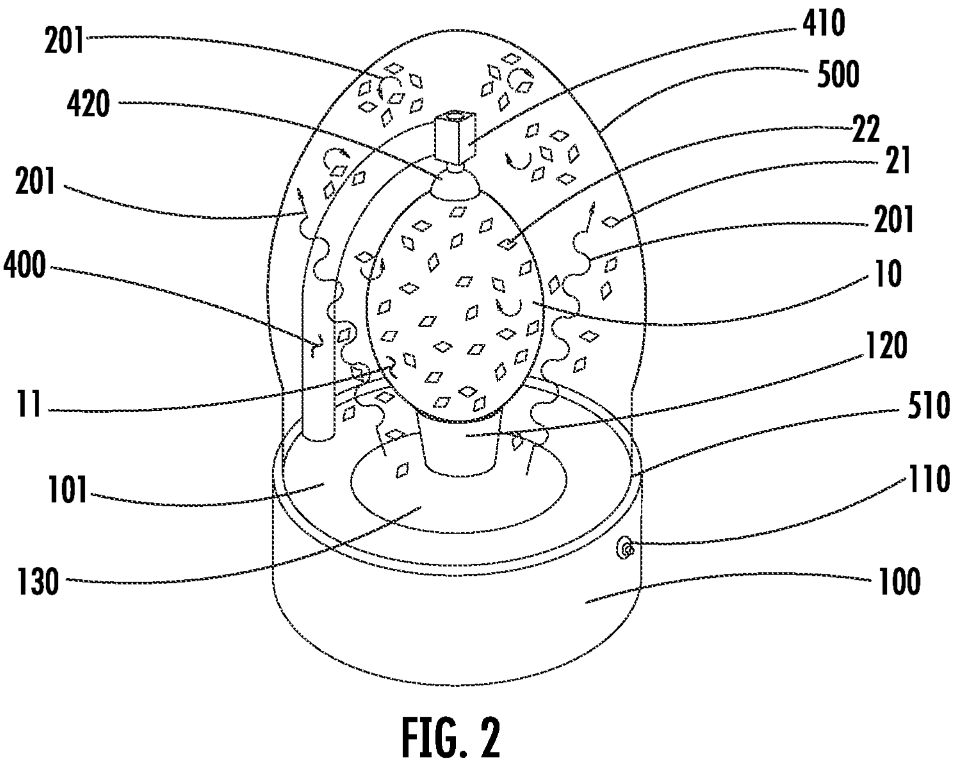
FIG. 2 is a perspective view of the device during operation, illustrating the turbulent air dynamically suspending decoration materials, which are then randomly deposited onto the object being decorated.

The automatic materials deposition process enables the user to observe the entire materials deposition process, to see their artwork come to fruition, while also directly controlling the materials deposition process. FIG. 2 illustrates the device and method in operation with an egg or egg-shaped objects 10, which the device 1 is utilized to generate the outcome of automated materials deposition onto the object 10.

Figure 5:
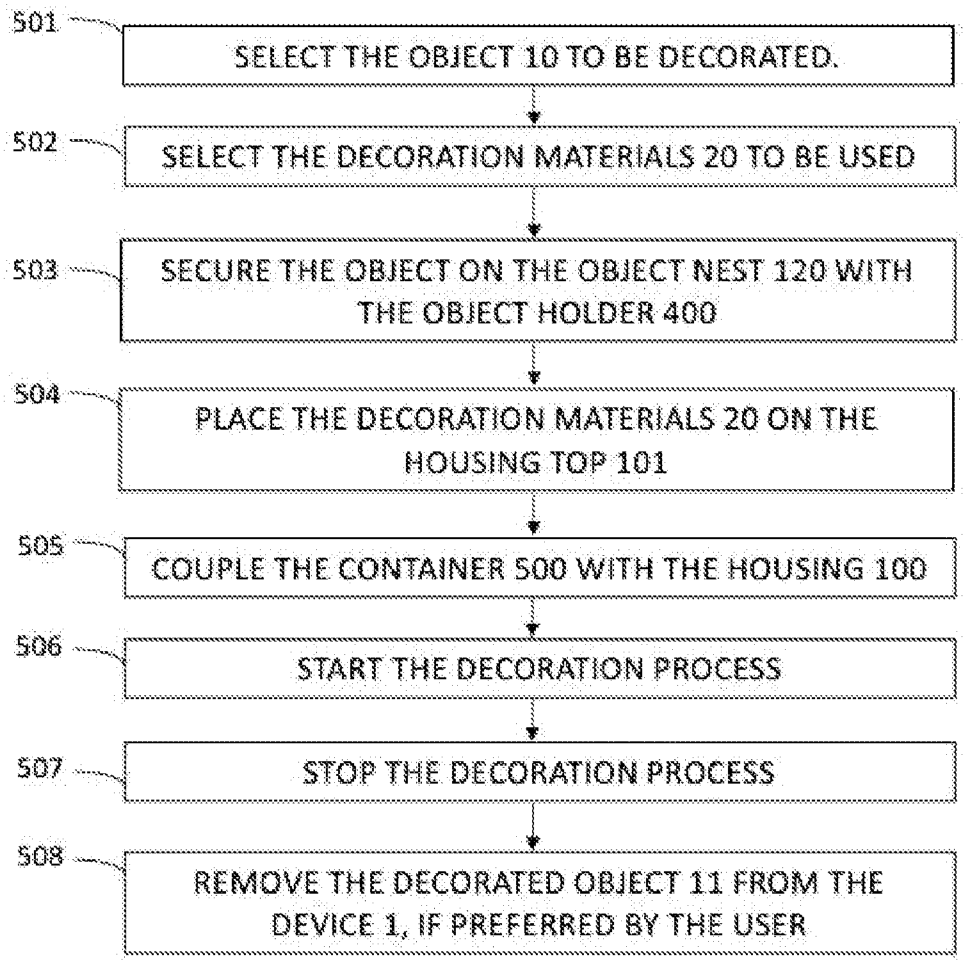
FIG. 5 is a flowchart illustrating an example sequence of operating the device.

Referring now to FIG. 5, an embodiment of sequence for using the device 1 described herein is illustrated. The decoration process may start by the user selecting the object 10 to be decorated and the decoration materials 20 to be used (see blocks 501 and 502). Then, the user may plan how they would like to decorate the object 10. The object 10 may be decorated by any process subject of current state of the art in the industry prior to further decorating as described, or plain, undecorated objects 10 may be used as well. State of the art decorating may include dying with food coloring, painting, marking with pens or markers, or even with the application of adhesives may be applied if desired. Unlimited decoration possibilities are possible in the object decoration process, and these processes can be incorporated with the materials deposition process disclosed herein.

Once the object 10, the decoration materials 20, and the decoration method are decided, the user may then place the object 10 into the device 1 in block 503, by securing the object 10 onto the object support 120 with the object holder 400. As previously disclosed, the object holder 400 may function through the use of simple elastic materials selected for design and function, or a spring-loaded function may be incorporated into the bushing 410, which would enable the object holder 400 to accommodate varying morphologies of the object 10. Once the object 10 is secured into the device 1, the user places the selected decoration materials 20 onto the housing top 101 (block 504) as shown in FIG. 1.

In some embodiments, the housing top 101 may be angled or sloped downward from an outer periphery toward a housing center to yield a funnel shape to support several aspects of the device. The first primary aspect is that the funnel shape provides a reservoir for the user to place the decoration materials 20 into the device 1. The second primary function of the funnel shape is to direct the decoration materials 20 along the funnel slope, directing the decoration materials 20 onto the air membrane 130 for further circulated through material deposition process by the air circulator 200.

Next, the user couples the container 500 to the housing 100 in block 505 as disclosed above, then the decoration process may be started in block 506 by commencing circulation of the decoration materials 20 within the volumetric enclosure. For example, in some embodiments, an automatic materials deposition process is started by the user pressing the power switch 110. The switch may accommodate multiple air circulation speeds such as by operating a fan, which in turn may yield different decorating results. FIG. 2 illustrates the materials deposition process during operation, wherein the decoration materials 20 becomes dynamically suspended decoration materials 21 through turbulent air currents 201 generated by the device 1 as described herein. The materials deposition process continues as long as the device 1 is energized. The materials deposition process is possible through the creation of high occurrences of interactions between the dynamically suspended decoration materials 21 and the object 10, wherein some of the interactions result in deposited decoration materials 22 onto the object 10 to create a decorated object 11.

In some embodiments, the power source 300, the power switch 110, and the air circulator 200 are not included with the device 1. In such embodiments, the user may manually provide the random interactions between the decoration materials 20 and the object 10, such as by grasping the device 1 and shaking it and/or turning it over, etc. to manually move the decoration materials 20 around inside the volume to bring the decoration materials 20 into contact with the object 10.

When the user is satisfied with the decoration quality of the decorated object 11, the user then de-energizes the device 1 through de-activation of the power switch 110 to stop the decoration process or just through stopping shaking the device 1 in block 507 to cease circulation of the decoration materials 20. The user may display the decorated object 11 in the present state inside the device 1, which is enabled through the transparent nature of the container 500. If preferred, the user may also disconnect the container 500 from the housing 100 and remove the decorated object 11 from the device 1 or remove the decorated object 11 directly through the access door 90 in block 508. The user may also place the decorated object 11 back into the device 1 using newly selected decoration materials 20 to add additional decoration to the decorated object 11. Similarly, the user may also remove the remaining decoration materials 20 from the device 1 by removing the container 500 from the housing 100 and then turning the device 1 on its side or by directly by the access door 90. This is analogous to pouring the decoration materials 20 out of any small container. The funnel shape of the housing top 101 encourages removal of the decoration materials 20 from the device 1.

The transparent design of the container 500 enables the user, and observers, of the device 1 to visually observe the automatic deposition of materials onto the object 10. This process is not only enjoyable for the user to see as the artistic creation as it is being created, but also allows the user to control the beginning and ending time of the materials deposition process through activation and deactivation of the power switch 110 in certain embodiments. In some embodiments, the materials deposition process may potentially be enhanced through the use of common adhesives, such as food grade sugar-based adhesives, or other adhesives. These adhesives may be applied directly to the object 10, or to the decoration materials 20. Although this is not required for the function of the device 1, this is disclosed as a potential option for users to enjoy the use of the product depending upon the desired artistic results, or to enhance the level of material deposition of certain types of the decoration materials 20.

While there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed is:

1. A material deposition device for decorating an object with decoration materials, comprising:

a housing as a structural framework, having an object support connected to the housing, the object support supporting the object to be decorated;

an object holder connected to the housing top and configured to secure the object to be decorated by constraining the object in conjunction with the object support; and a container releasably coupled to the housing to create a volumetric enclosure with the housing when coupled thereto, in which the decoration materials are contained, wherein the material deposition device causes the deposit of the decoration materials onto the object upon imparting motion to the decoration materials within the volumetric enclosure.

2. The material deposition device according to claim 1, further comprising an air circulator powered by a power source located in the housing, and an air membrane located on the housing top, wherein the air membrane enables air circulated by the air circulator to pass into the volumetric enclosure to impart motion to the decoration materials when the container is coupled to the housing.

3. The material deposition device according to claim 2, wherein the air circulator is operable only when the housing is connected to the container.

4. The material deposition device according to claim 3, wherein the air circulator is capable of operating at multiple speeds.

5. The material deposition device according to claim 1, wherein the object holder includes a bushing, an upper support, and a gantry arm.

6. The material deposition device according to claim 5, wherein the bushing of the object holder further includes an integrated mechanical spring.

7. The material deposition device according to claim 1, wherein the object support further includes an adjustable opening.

8. The material deposition device according to claim 1, further comprising an interfacing locking mechanism between the housing and the container.

9. The material deposition device according to claim 8, wherein the interfacing locking mechanism includes one or more retention members.

10. The material deposition device according to claim 8, wherein the interfacing locking mechanism includes an elastic body lock and a lock receiving opening.

11. The material deposition device according to claim 1, further comprising a container housing connection.

12. The material deposition device according to claim 11, wherein the container housing connection is a snap-fit mechanism.

13. The material deposition device according to claim 1, wherein the housing and/or the container further include an access door to provide access to the volumetric enclosure.

14. The material deposition device according to claim 13, wherein the access door is located at the bottom of the housing.

15. The material deposition device according to claim 13, wherein the access door provides access in a pivoting manner.

16. The material deposition device according to claim 1, wherein the housing top is angled toward a housing center to yield a funnel shape.

17. An electric device for the deposition of decoration materials onto an object, comprising:

a housing as a structural framework, having:

an air circulator;

a power source for powering the air circulator;

a housing top for receiving the decoration materials; and an object support connected to the housing top, the object support matching a geometry of the object to be decorated; and a container releasably coupled to the housing to create a volumetric enclosure with the housing when coupled thereto, wherein air generated by the air circulator passes into the container to circulate the decoration materials within the volumetric enclosure and onto the object to be decorated.

18. The electric device of claim 17 further comprising an object holder connected to the housing top and configured to secure the object to be decorated by constraining the object between the object support and an upper end of the object holder.

19. A method of decorating an object with the material deposition device according to claim 1, comprising:

a) selecting the object to be decorated;

b) selecting the decoration materials to be used;

c) securing the selected object to be decorated on the object support with the object holder;

d) placing the selected decoration materials on the housing top;

e) coupling the container with the housing;

f) commencing circulation of the decoration materials within the volumetric enclosure; and g) ceasing circulation of the decoration material.

* * * * *